US008386753B2

(12) United States Patent
Eisen et al.

(10) Patent No.: US 8,386,753 B2
(45) Date of Patent: Feb. 26, 2013

(54) COMPLETION ARBITRATION FOR MORE THAN TWO THREADS BASED ON RESOURCE LIMITATIONS

(75) Inventors: Susan E. Eisen, Round Rock, TX (US); Dung Q. Nguyen, Austin, TX (US); Balaram Sinharoy, Poughkeepsie, NY (US); Benjamin W. Stolt, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 495 days.

(21) Appl. No.: 12/423,561

(22) Filed: Apr. 14, 2009

(65) Prior Publication Data

US 2010/0262967 A1    Oct. 14, 2010

(51) Int. Cl.
*G06F 9/38* (2006.01)
(52) U.S. Cl. ........................ 712/216; 712/218
(58) Field of Classification Search .................. None
See application file for complete search history.

(56) References Cited

U.S. PATENT DOCUMENTS

| | | | | |
|---|---|---|---|---|
| 5,761,713 | A * | 6/1998 | Lesartre ........................ | 711/127 |
| 5,875,316 | A * | 2/1999 | Panwar et al. ................. | 712/215 |
| 6,513,084 | B1 | 1/2003 | Berkowitz et al. | |
| 6,675,191 | B1 | 1/2004 | Ito | |
| 6,694,347 | B2 * | 2/2004 | Joy et al. ........................ | 718/108 |
| 6,917,967 | B2 | 7/2005 | Wu et al. | |
| 7,194,518 | B2 | 3/2007 | Berkowitz et al. | |
| 7,366,829 | B1 * | 4/2008 | Luttrell et al. ................. | 711/108 |
| 7,401,211 | B2 * | 7/2008 | Kottapalli et al. ............. | 712/245 |
| 2002/0199088 | A1 * | 12/2002 | Burns et al. .................... | 712/228 |
| 2007/0067607 | A1 * | 3/2007 | Jiao et al. ....................... | 712/215 |
| 2007/0204137 | A1 * | 8/2007 | Tran .............................. | 712/214 |
| 2008/0022075 | A1 * | 1/2008 | Osanai et al. ................. | 712/218 |

OTHER PUBLICATIONS

Kucuk, G., et al., Distributed Reorder Buffer Schemes for Low Power, 2003, IEEE, Proceedings of the 21st Intl. Conf. on Computer Design, 7 pages.*
Eisley, Noel et al., "High-Level Power Analysis for Multi-Core Chips", ACM, CASES'06, Oct. 23-25, 2006, pp. 389-400.
Krashinsky, Ronny et al., "The Vector-Thread Architecture", IEEE, Proceedings of the 31st Annual International Symposium on Computer Architecture (ISCA'04), 12 pages.

* cited by examiner

*Primary Examiner* — Eric Coleman
(74) *Attorney, Agent, or Firm* — Stephen J. Walder, Jr.; Diana R. Gerhardt

(57) ABSTRACT

A mechanism is provided for thread completion arbitration. The mechanism comprises executing more than two threads of instructions simultaneously in the processor, selecting a first thread from a first subset of threads, in the more than two threads, for completion of execution within the processor, and selecting a second thread from a second subset of threads, in the more than two threads, for completion of execution within the processor. The mechanism further comprises completing execution of the first and second threads by committing results of the execution of the first and second threads to a storage device associated with the processor. At least one of the first subset of threads or the second subset of threads comprise two or more threads from the more than two threads. The first subset of threads and second subset of threads have different threads from one another.

20 Claims, 7 Drawing Sheets

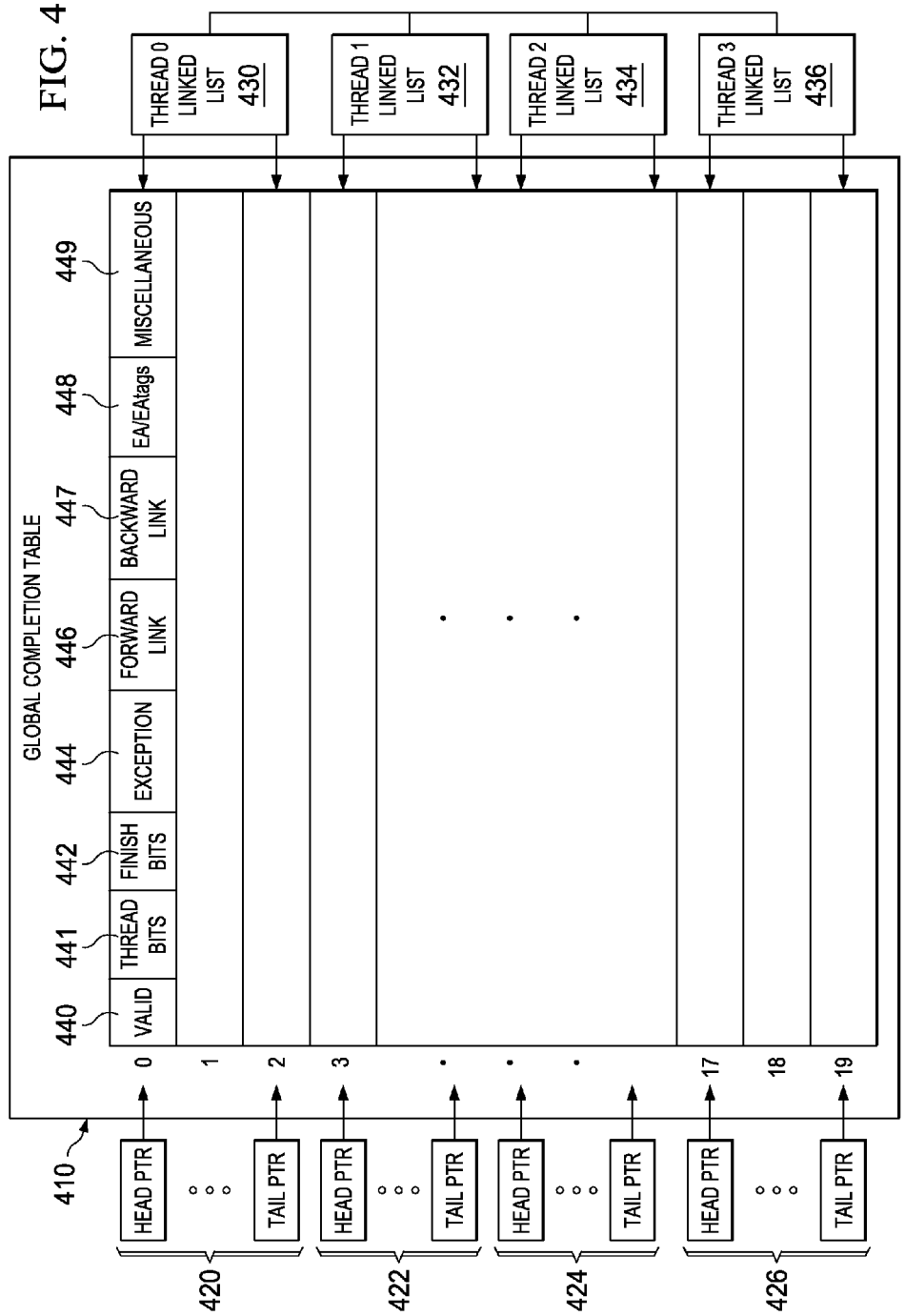

COMPLETION ARBITRATION FOR MORE THAN TWO THREADS BASED ON RESOURCE LIMITATIONS

This invention was made with United States Government support under Agreement No. HR0011-07-9-0002 awarded by DARPA. THE GOVERNMENT HAS CERTAIN RIGHTS IN THE INVENTION.

BACKGROUND

The present application relates generally to an improved data processing apparatus and method and more specifically to mechanisms for completion arbitration for more than two threads based on resource limitations.

Typical advanced microprocessors have executed instructions from a single instruction stream. Performance has improved over the years through many architectural techniques, such as caches, branch prediction, and out-of-order execution. These lead to improved performance at a given processor frequency by increasing instruction-level parallelism. At the same time, through the use of longer pipelines and fewer logic levels per stage, processor frequencies have been increasing more rapidly than the technology. Despite the architectural advances, the frequency improvements lead to lower execution unit utilizations. This is due to an increase in the number of cycles for instruction execution, cache misses, branch mispredictions, and memory access. It is common to see average execution unit utilizations of 25% across a broad range of workloads.

To increase execution unit utilization, multithreading has been introduced. This creates thread-level parallelism that increases processor throughput. To the operating system, multithreading looks almost the same as symmetric multiprocessing. There are at least three different methods for handling multiple threads: coarse-grain multithreading, fine-grain multithreading, and simultaneous multithreading.

In coarse-grain multithreading, only one thread executes at any given instant in time. When a thread encounters a long-latency event, such as a cache miss, the hardware swaps in a second thread to use the machine resources rather than letting it be idle. By allowing other work to use what otherwise would have been idle cycles, overall system throughput is increased. To conserve chip area, both threads share many of the system resources, such as architected registers. Hence, to swap program control from one thread to another requires several cycles. International Business Machines (IBM) Corporation, of Armonk, N.Y., introduced coarse-grain threading on the IBM pSeries S85.

Fine-grain multithreading switches between threads each cycle. In this class of machines, a different thread is executed in a round-robin fashion. As in coarse-grain multithreading, the architected states of multiple threads are all maintained in the processor. Fine-grain multithreading allows overlap of short pipeline latencies by letting another thread fill in execution gaps that would otherwise exist. With a larger number of threads, longer latencies can be successfully overlapped. For long-latency events in a single thread, if the number of threads is less than the number of latency cycles, there will be empty execution cycles for that thread. To accommodate this design, hardware facilities are duplicated. When a thread encounters a long-latency event, its cycles remain unused.

Simultaneous multithreading (SMT) maintains the architected states of multiple threads. This type of multithreading is distinguished by having the ability to schedule instructions from all threads concurrently. On any given cycle, instructions from one or more threads may be executing on different execution units. With SMT, the system adjusts dynamically to the environment, allowing instructions to execute from each thread if possible while allowing instructions from one thread to utilize all of the execution units if the other thread(s) cannot make use of them. This allows the system to dynamically adjust to the environment. The POWER5 system, available from IBM Corporation, implements two threads per processor core. That is, the current state of the art is limited to SMT systems in which each processor is at most able to simultaneously execute two threads. Both threads share execution units if both have work to do. If one thread is waiting for a long-latency event, the other thread can achieve a greater share of execution unit time.

SUMMARY

In one illustrative embodiment, a method, in a processor, is provided for thread completion arbitration. The method comprises executing more than two threads of instructions simultaneously in the processor, selecting a first thread from a first subset of threads, in the more than two threads, for completion of execution within the processor, and selecting a second thread from a second subset of threads, in the more than two threads, for completion of execution within the processor. The method further comprises completing execution of the first and second threads by committing results of the execution of the first and second threads to a storage device associated with the processor. At least one of the first subset of threads or the second subset of threads comprise two or more threads from the more than two threads. The first subset of threads and second subset of threads have different threads from one another.

In other illustrative embodiments, a computer program product comprising a computer useable or readable medium having a computer readable program is provided. The computer readable program, when executed on a computing device, causes the computing device to perform various ones, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein:

FIG. 4 is an example diagram of an SMT indexing mechanism and global completion table in accordance with one illustrative embodiment;

DETAILED DESCRIPTION

The illustrative embodiments provide a mechanism for completion arbitration for more than two threads based on resource limitations. The mechanisms of the illustrative embodiments may be implemented in a processor architecture in which more than two threads may be executed in a simultaneous threading (SMT) environment. Such a processor architecture may be implemented in one or more processors of a data processing system. Such a data processing system may be a server data processing system, client data processing system, stand-alone computing device, or the like.

Thus, the illustrative embodiments may be utilized in many different types of data processing environments including a distributed data processing environment, a single data processing device, or the like. In order to provide a context for the description of the specific elements and functionality of the illustrative embodiments, FIGS. 1 and 2 are provided hereafter as example environments in which aspects of the illustrative embodiments may be implemented.

Figure 1:
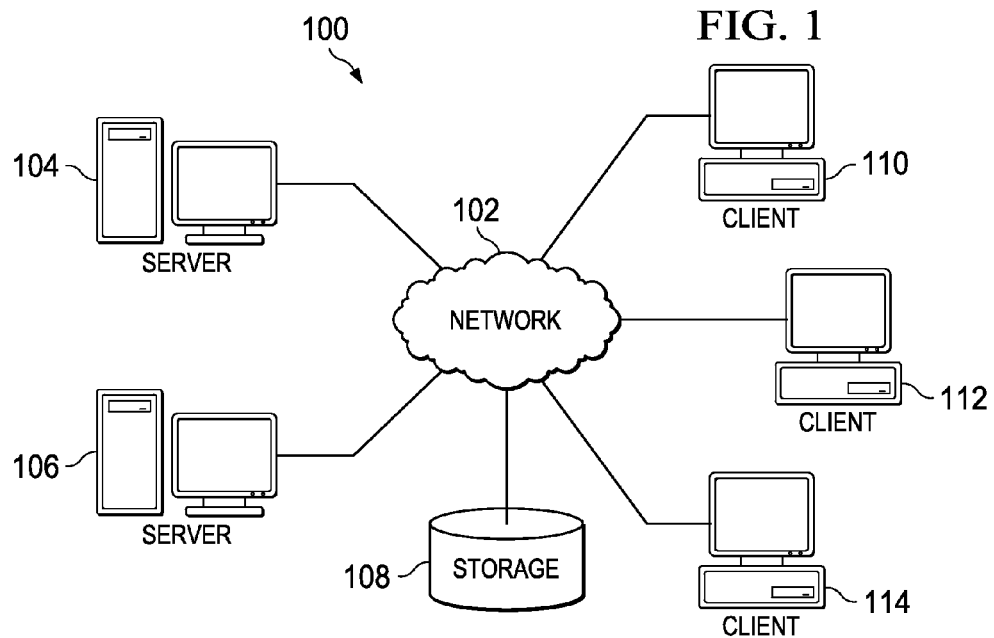
FIG. 1 depicts a pictorial representation of an example distributed data processing system in which aspects of the illustrative embodiments may be implemented.
Figure 2:
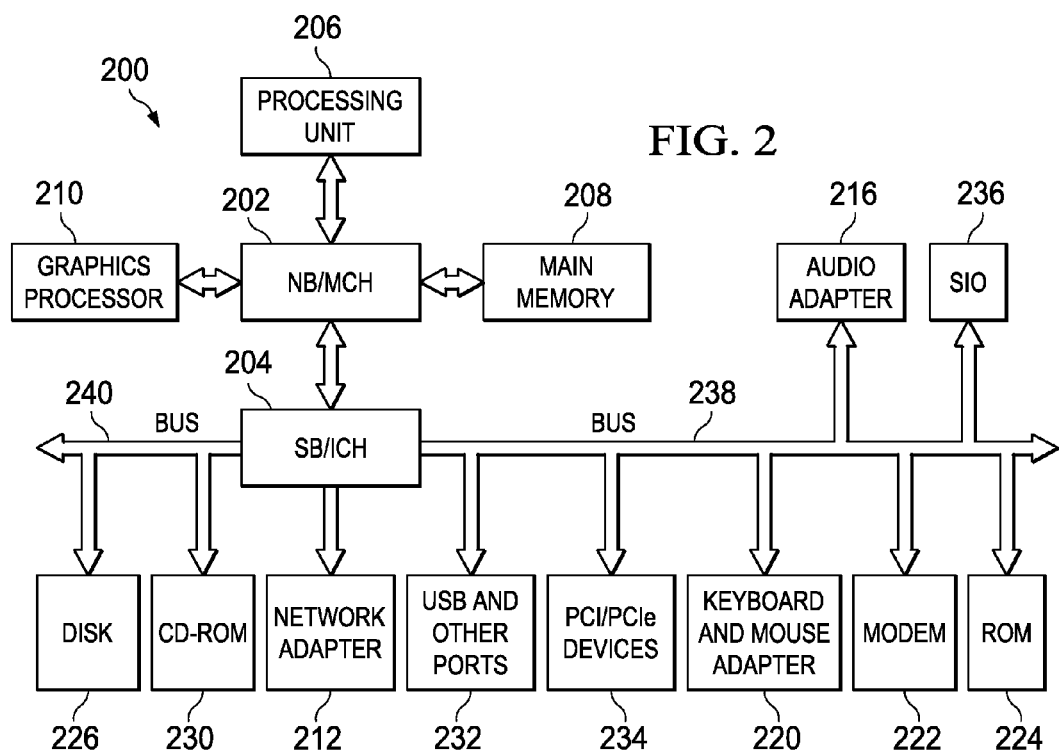
FIG. 2 is an example block diagram of a data processing system in which aspects of the illustrative embodiments may be implemented.

With reference now to the figures and in particular with reference to FIGS. 1-2, example diagrams of data processing environments are provided in which illustrative embodiments of the present invention may be implemented. It should be appreciated that FIGS. 1-2 are only examples and are not intended to assert or imply any limitation with regard to the environments in which aspects or embodiments of the present invention may be implemented. Many modifications to the depicted environments may be made without departing from the spirit and scope of the present invention.

With reference now to the figures, FIG. 1 depicts a pictorial representation of an example distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

With reference now to FIG. 2, a block diagram of an example data processing system is shown in which aspects of the illustrative embodiments may be implemented. Data processing system 200 is an example of a computer, such as client 110 in FIG. 1, in which computer usable code or instructions implementing the processes for illustrative embodiments of the present invention may be located.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206. The operating system coordinates and provides control of various components within the data processing system 200 in FIG. 2. As a client, the operating system may be a commercially available operating system such as Microsoft® Windows® XP (Microsoft and Windows are trademarks of Microsoft Corporation in the United States, other countries, or both). An object-oriented programming system, such as the Java™ programming system, may run in conjunction with the operating system and provides calls to the operating system from Java™ programs or applications executing on data processing system 200 (Java is a trademark of Sun Microsystems, Inc. in the United States, other countries, or both).

As a server, data processing system 200 may be, for example, an IBM® eServer™ System p® computer system, running the Advanced Interactive Executive (AIX®) operating system or the LINUX® operating system (eServer, System p, and AIX are trademarks of International Business Machines Corporation in the United States, other countries, or both while LINUX is a trademark of Linus Torvalds in the United States, other countries, or both). Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device which is configured with flash memory to provide non-volatile memory for storing operating system files and/or user-generated data, for example. Essentially, data processing system 200 may be any known or later developed data processing system without architectural limitation.

As will be appreciated by one skilled in the art, the present invention may be embodied as a system, method, or computer program product. Accordingly, unless otherwise indicated, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example, but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, radio frequency (RF), etc.

Computer program code for carrying out operations of the present invention may be written in any combination of one or more programming languages, including an object oriented programming language such as Java™, Smalltalk™, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The illustrative embodiments are described below with reference to flowchart illustrations and/or block diagrams of methods, apparatus (systems) and computer program products according to the illustrative embodiments of the invention. It will be understood that each block of the flowchart illustrations and/or block diagrams, and combinations of blocks in the flowchart illustrations and/or block diagrams, can be implemented by hardware elements and/or computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The illustrative embodiments improve upon known simultaneous multithreading (SMT) architectures by providing mechanism for implementing more than two threads executing simultaneously. As noted above, the POWER5 processor provides a processor architecture in which simultaneous multithreading (SMT) is made available. The SMT capability provided by the POWER5 processor architecture permits at most two threads to execute simultaneously. The illustrative embodiments herein improve upon the POWER5 processor architecture by modifying the architecture to support more than two threads executing simultaneously, e.g., four threads, while taking into account resource limitations with regard to the completion of these threads. That is, the mechanisms of the illustrative embodiments allow more than two threads to execute simultaneously while minimizing the amount of architecture changes necessary to implement more than two threads executing simultaneously, minimizing the complexity of the devices in the processor architecture, and minimizing the complexity of the completion logic needed to allow such greater than two thread SMT capability.

Figure 3A:
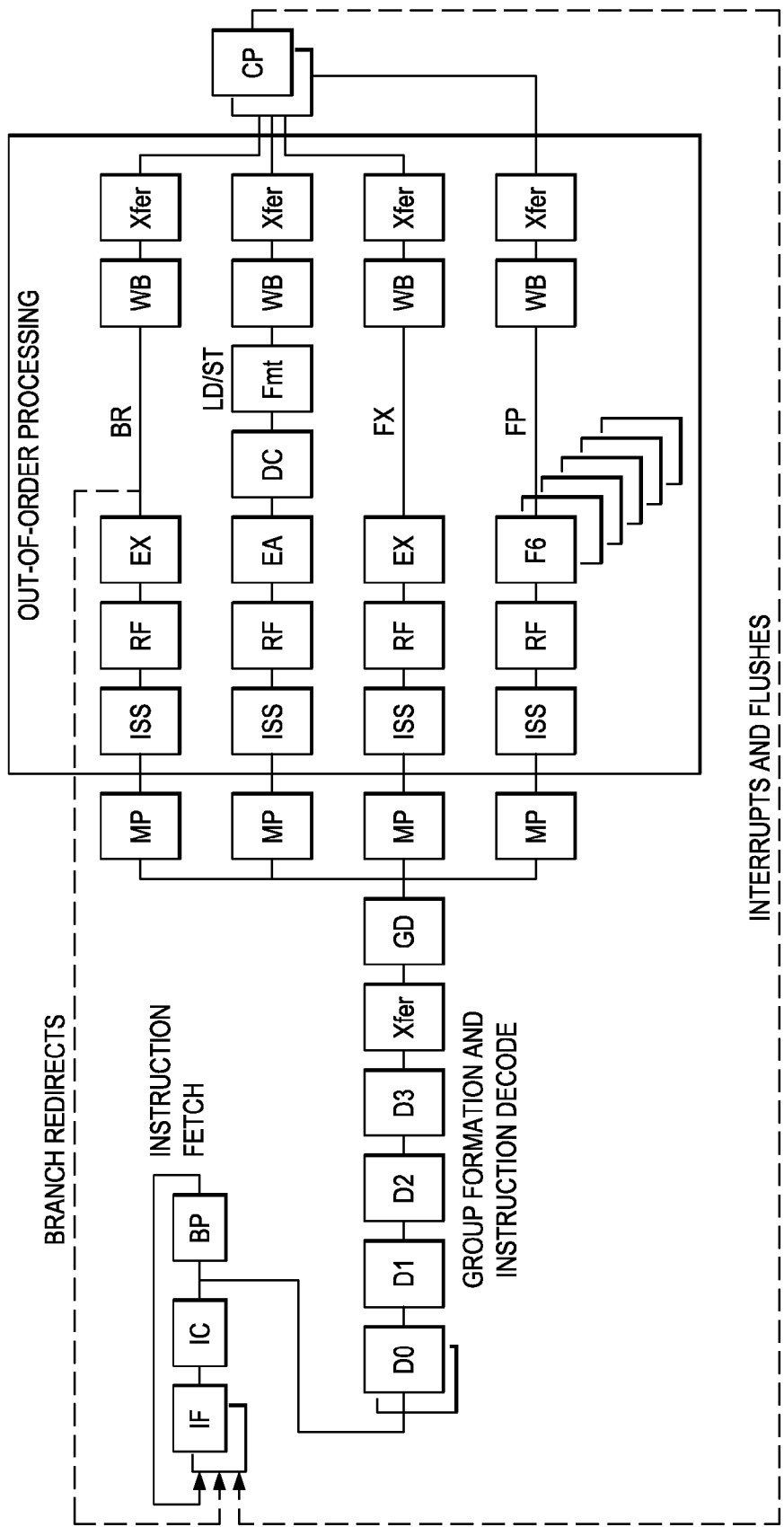
FIG. 3A is an example diagram of an instruction pipeline for a processor architecture in accordance with one illustrative embodiment.
Figure 3B:
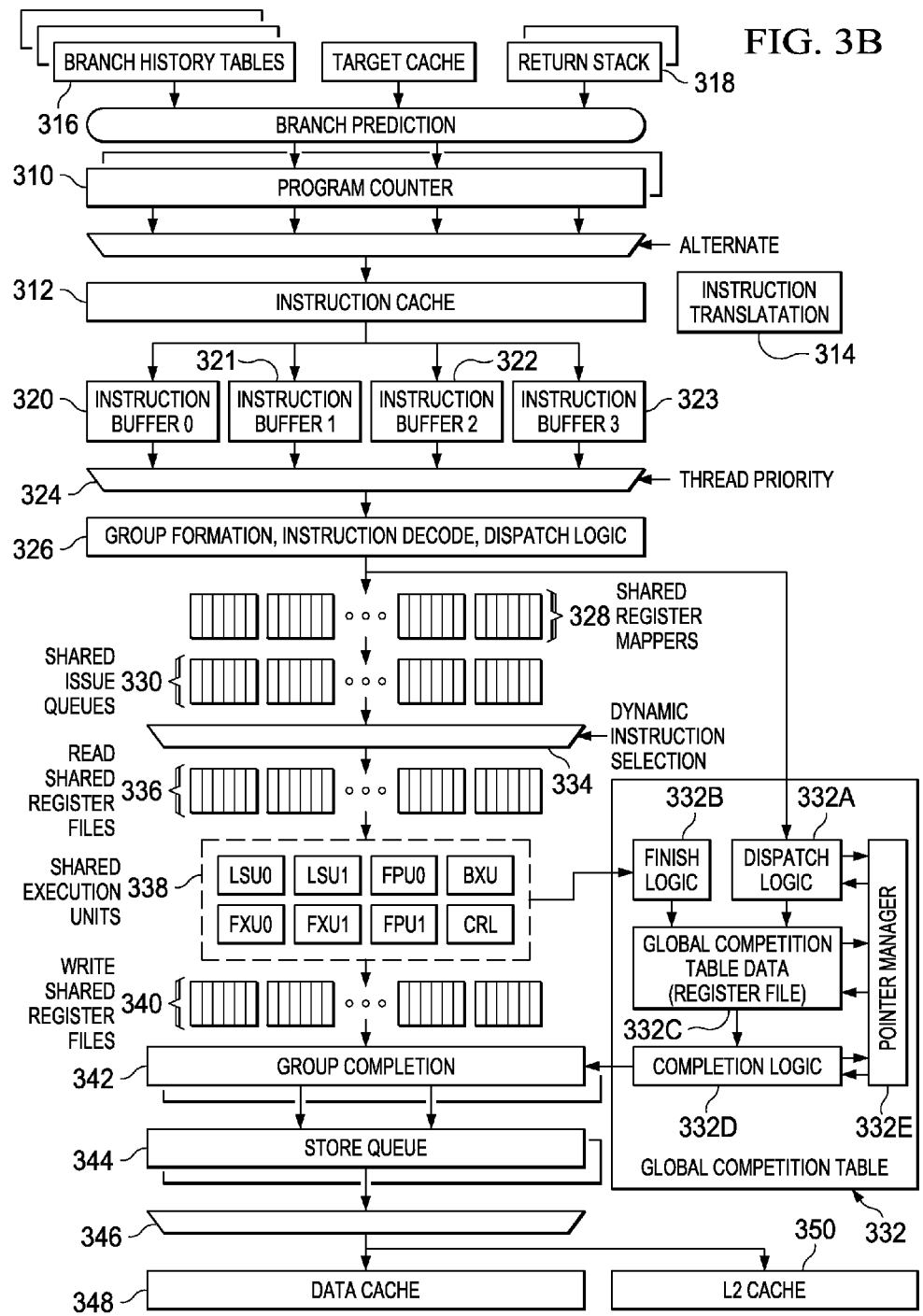
FIG. 3B is an example diagram of instruction data flow in the processor architecture of FIG. 3A.

The illustrative embodiments expand upon the POWER5 processor architecture by providing additional program counters and multiplexers between the program counter and the instruction cache, providing additional instruction buffers, and the like, in addition to providing the specific internal mechanisms of the global completion table unit that are the focus of the illustrative embodiments described hereafter. FIGS. 3A and 3B are example diagrams illustrating a processor architecture that may be used to implement the mechanisms of the illustrative embodiments.

FIG. 3A is an example diagram of an instruction pipeline for a processor in accordance with one illustrative embodiment. FIG. 3B is an example diagram of instruction data flow in the processor architecture of FIG. 3A. The operation of the processor architecture will now be described with reference to both FIGS. 3A and 3B.

Initially, the program counters 310 are loaded with the address for the next instruction for each thread (instruction fetch (IF) pipeline stage in FIG. 3A). In the depicted example, the processor architecture facilitates the simultaneous multithreading of up to 4 threads. The instructions are fetched from the instruction cache 312 (IC pipeline stage in FIG. 3A). In one example implementation, up to 8 instructions may be fetched from the instruction cache 312 per processor cycle. The instruction cache 312 and the instruction translation facility 314 are shared between the threads.

In a given cycle, instructions are fetched from the same thread. Instructions are then scanned for branches and if a branch is found, the direction of that branch is predicted (BP pipeline stage) using three branch history tables (BHTs) 316 that are shared by the threads. Two of the BHTs 316 are used for predicting branch directions on the basis of bimodal and path-correlated branch-prediction mechanisms. The third BHT 316 is used to predict which of these prediction mechanisms is more likely to predict the correct direction. If the instructions fetched are all branches, all can be predicted at the same time.

In addition to the direction prediction, the depicted microprocessor architecture also predicts the target of a taken branch in this group of instructions. Branch target addresses for the "branch to link" register (bclr) and "branch to count" register (bcctr) instructions can be predicted using a hardware-implemented return address stack 318 and a count cache mechanism, respectively. Target addresses for absolute and relative branches are computed directly as part of the branch scan function. If there is a taken branch, the program counter 310 is loaded with the target address of the branch. Otherwise, the program counter 310 is loaded with the address of the next sequential instruction from which fetching is to be performed. Each branch is entered in effective address table (EAT) storage device at instruction fetch time. The EAT saves the necessary information to recover from a mispredicted branch. Entries are deallocated in program order when branches are executed.

In one possible simultaneous multithread (SMT) mode, also referred to as SMT4 mode, since 4 threads are permitted to execute simultaneously, four separate program counters 310 are used, one for each thread. Instruction fetches alternate between the four threads. Similarly, branch prediction alternates between threads. In single thread (ST) mode, only one program counter 310 is used, and instructions can be fetched for that thread every cycle. In a SMT2 mode, 2 threads are permitted to execute simultaneously with instructions fetches and branch prediction alternating between the 2 threads.

After fetching (before pipeline stage D1 in FIG. 3A), instructions are placed in separate instruction buffers 320-322 for the four threads. In one illustrative embodiment, these buffers may contain up to 24 instructions each. On the basis of thread priority, up to five instructions are fetched from one of the instruction buffers (D0 pipeline stage in FIG. 3A), such as via multiplexer 324, and a group is formed (pipeline stages D1 through D3 in FIG. 3A), such as via group formation, instruction decode, and dispatch logic 326. Instructions in a group are all from the same thread. All instructions in the group are decoded in parallel.

When all of the resources necessary for dispatch are available for the group, the group is dispatched (GD pipeline stage in FIG. 3A). Instructions flow between group formation and dispatch in program order (D0 through GD pipeline stages in FIG. 3A). After dispatch, each instruction flows through the register-renaming facilities 328, where the logical register numbers in the instruction are mapped to physical registers (MP pipeline stage in FIG. 3A). The register files are dynamically shared by the four threads. In ST mode, all physical registers are available to the single thread, allowing higher instruction-level parallelism. In SMT2 mode, the register files are dynamically shared by two threads. After register renaming, instructions are placed in the shared issue queues 330.

To simplify the logic for tracking instructions through the pipeline, instructions are tracked as a group. Control information for each group of dispatched instructions is placed in a global completion table (GCT) unit 332, such as by the logic 332A of the GCT unit 332 (referred to hereafter as simply the "GCT"), at the time of dispatch by the group formation, instruction decode, and dispatch logic 326. The GCT entry 332C contains all the information needed to track the group of instructions until it completes, including age tracking information, finish status, address pointers, and miscellaneous status bits. Logically, the entries in the GCT are allocated in program order for each thread. While the entries in the GCT 332 are allocated and de-allocated in program order for a given thread, the entries can be intermingled between the two threads in any arbitrary order.

In addition to allocating GCT 332 and register renaming 328, other necessary conditions for dispatch are to allocate load reorder queue (LRQ) and store reorder queue (SRQ) entries for the load and store instructions in the group. These two queues maintain the program order of loads and stores within a thread and allow for checking of address conflicts between loads and stores.

When all input operands for an instruction are available, it becomes eligible for issue. Among the eligible instructions in the issue queue 330, one of the oldest is selected and issued for execution (ISS pipeline stage in FIG. 3A), such as by multiplexer 334. For instruction issue, no distinction is made between instructions from the four threads. There is no priority difference between the threads, and instruction issue is independent of the GCT group to which the instruction belongs; hence, instructions can issue concurrently from multiple groups. Up to eight instructions, one to each execution unit, can issue in a cycle. When issued, the instruction reads its input physical registers (RF pipeline stage in FIG. 3A) 336, executes on the proper execution unit 338 (EX pipeline stage for the branch execution unit, the fixed-point execution units, and the logical condition register unit; EA, DC, and Fmt pipeline stages for the load/store units; and F1 through F6 pipeline stages for the floating-point execution units), and writes the result back to the output physical register 340 (WB pipeline stage in FIG. 3A).

When all of the instructions in a group have executed (without generating any exception) and the group is the oldest group of a given thread, the group becomes eligible to complete. This is tracked using finish indications that are sent from the execution units 338 back to the GCT finish logic 332B which will set the appropriate GCT bits in the GCT data of the register file 332C. When all the finish bits are set, meaning all the instructions in a group have finished, that group can complete. Eligibility for completion and actual completion is determined and performed by the GCT completion logic 332D. When a group completes, all the data associated with that group is committed 342 (CP pipeline stage in FIG. 3A) and the entry is de-allocated from the GCT 332. Up to two groups can complete per cycle, thus two groups can commit per cycle. At this point, mappers commit any associated register file data to architected state, store data that is to be committed in store queues 344 for the respective threads, and selectively, via multiplexer 346, store the data to the data cache 348 or L2 cache 350.

With the improved processor architecture of the illustrative embodiments, the aim is to keep as much of the operation of the processor architecture unchanged from the POWER5 architecture as possible while still improving the operation of the architecture to allow more than two threads to be simultaneously executed in a SMT manner. In one illustrative embodiment, the number of threads that may be simultaneously executed by the processor architecture is four. By keeping much of the architecture operating in the same manner as the POWER5 architecture, the complexity of the elements in the architecture may be maintained at the same level of complexity as in the POWER5 architecture, i.e. the increase in complexity of the overall architecture is minimized while increasing the number of SMT threads. However, in keeping portions of the architecture unchanged, some resources in the architecture have limitations with regard to being able to support completion events in simultaneously executing threads. That is, some resources can only handle completion of groups from at most two threads per processor cycle and an arbitration mechanism is required to control which of the 4 threads will complete in any given cycle.

One way in which the improved processor architecture operates in a similar manner to that of the POWER5 architecture is that the global completion table is shared amongst the plurality of SMT threads. However, in the case of the illustrative embodiments, this sharing of the global completion table is performed amongst more than two threads. The illustrative embodiments provide mechanisms for permitting such sharing and use of the global completion table by greater than two threads, e.g., four threads, while still ensuring that at most, groups of instructions from two threads are able to complete per processor cycle. That is, in a processor architecture in which more than two threads may execute simultaneously, it is possible that groups of instructions from more than two threads could complete at the same time, without a control mechanism being in place. The illustrative embodiments provide such a control mechanism by using two slots with each slot handling a subset of the threads that are executing and logic that provides a selection of which threads are to be permitted to complete each processor cycle.

For example, a first slot may be used to handle all even numbered threads while a second slot may be used to handle all odd numbered threads, based on the threads associated thread identifiers (TIDs). Thus, for example, in a processor architecture in which four threads are able to be executed in a simultaneous manner, i.e. a SMT4 mode of operation, the first slot may handle threads 0 and 2 while the second slot may handle threads 1 and 3. With regard to each individual slot, the threads associated with that slot "compete" for the opportunity to complete during a processor cycle. Thus, in the above example, threads 0 and 2 would compete with each other to complete on the first slot while threads 1 and 3 compete with each other on the second slot for the opportunity to complete during the current processor cycle. The results of this competition are decided by a mechanism that selects the thread that did not most recently complete. Of course, in some instances, completion of threads within or by a certain time is required and thus, a mechanism for handling such exceptions to the default operation is also provided. An exception condition may require a thread to either be blocked from completing. In such a case, some external action is taken or the thread is required to complete immediately, overriding the normal thread selection mechanism. Both of these cases are indicated per thread from the exception handling logic and are factored into the completion selection mechanism.

With the shared global completion table (GCT) of the illustrative embodiments, the GCT is indexed by a set of head and tail pointers for each thread. The order of the groups of instructions within each thread is tracked through a double linked list (forward and backward links). The pointers are managed individually and a set of thread and valid bits to ensure that there is no collision between threads. With the illustrative embodiments, as with the POWER5 architecture of FIGS. 3A-3B, completion is limited to 2 groups of instructions at a time. Thus, an arbitration mechanism is used between the 4 threads that are simultaneously executing. This arbitration mechanism utilizes the slots and selection logic previously mentioned. The arbitration mechanism operates without biasing completion towards any particular thread.

In one illustrative embodiment, threads are grouped into thread pairs for each of the two completion slots. For seamless switching between a SMT2 mode (in which only two threads are executed simultaneously as with the POWER5 architecture) and an SMT4 mode (in which four threads are executed simultaneously as with the improved architecture of the illustrative embodiments), even threads are allocated to slot 0 while odd threads use slot 1. During normal operation, when there is more than one thread ready to complete on a given slot, the thread that did not most recently complete is allowed to complete. However, this operation may be superseded by exception handling when a thread must complete at a certain time due to some external event, for example.

It should be appreciated that the above is just one example in which subsets of threads may be apportioned to a plurality of slots associated with the global completion table and for deciding between threads on each slot as to which should complete. Other mechanisms for apportioning threads and selecting between threads may be used without departing from the spirit and scope of the illustrative embodiments or the present invention.

FIG. 4 is an example diagram of an SMT indexing mechanism and global completion table in accordance with one illustrative embodiment. As shown in FIG. 4, the shared global completion table (GCT) 410 is indexed by a set of pointers 420-426 allocated to each thread (thread 0 to thread 3 in this case). These pointers may be managed by the pointer manager logic 332E of the GCT 332 in FIG. 3B, for example. Each set of pointers 420-426 includes a head pointer and a tail pointer associated with the thread. The head pointer points to the youngest group of instructions associated with the thread. The tail pointer points to the oldest group of instructions for the thread and is used to reference the groups that may become eligible for completion once all the instructions in that group have finished. When the group completes, this tail pointer is the global tag (gtag) that is broadcast to other parts of the processor architecture to allow data to be committed and resources deallocated. The head and tail pointers in each set of pointers 420-426 are managed individually.

The order of the groups of instructions within each thread is tracked through a double linked list referred to herein as the thread group linked list 430-436. It should be appreciated that the GCT 410 in FIG. 4 is shown as having contiguous sets of entries for each thread for purposes of simplicity of the illustration. However, in actuality, entries for each group of the different threads may be intermingled within the GCT 410 and the thread group linked lists 430-436 are used to identify the order of these entries in the GCT 410 corresponding to the same thread.

Each entry in the GCT 410 corresponds to a different group of instructions, with each group of instructions being associated with a thread. A set of valid bits 440 and a set of thread bits 441 are associated with each GCT entry and are used to identify which entries in the GCT 410 correspond to which threads. The entries of the GCT 410 further include finish bits 442, exception information 444, forward link 446, backward link 446, EA/EAtags 448, and a miscellaneous information field 449 that contains other information that may need to be tracked for the group, depending on implementation. The set of thread bits 441 identifies the thread with which the group of instruction corresponds. The finish bits 442 are set by the finish logic 332B of the GCT 332 in FIG. 3B or GCT 410 in FIG. 4, based on finish indications sent from the execution units 338 in FIG. 3B. The finish bits 442 indicate which instructions in the group of instructions represented by the GCT 410 entry have finished execution by the appropriate execution unit 338.

The exception information 444 indicates if any instructions in the group have generated an exception and the nature of the exception that was generated. The forward and backward links 446 and 447 essentially define the thread linked lists 430-436 in that each entry in the GCT 410 points to a previous group of instructions associated with the thread, if any, and a next group of instructions for the thread. The effective address (EA)/EA tags field 448 stores either the effective address or an assigned effective address tag, assigned by an Effective Address Table (EAT) (not shown), for the instructions that make up the group of instructions with which the GCT entry corresponds. For example, the EA/EA tag field 448 may specify a base EAtag and offset values for the first and last instructions in the group of instructions represented by the GCT entry. The miscellaneous field 449 provides a storage location for any other information that may be used by the processor architecture to perform some function.

Figure 5:
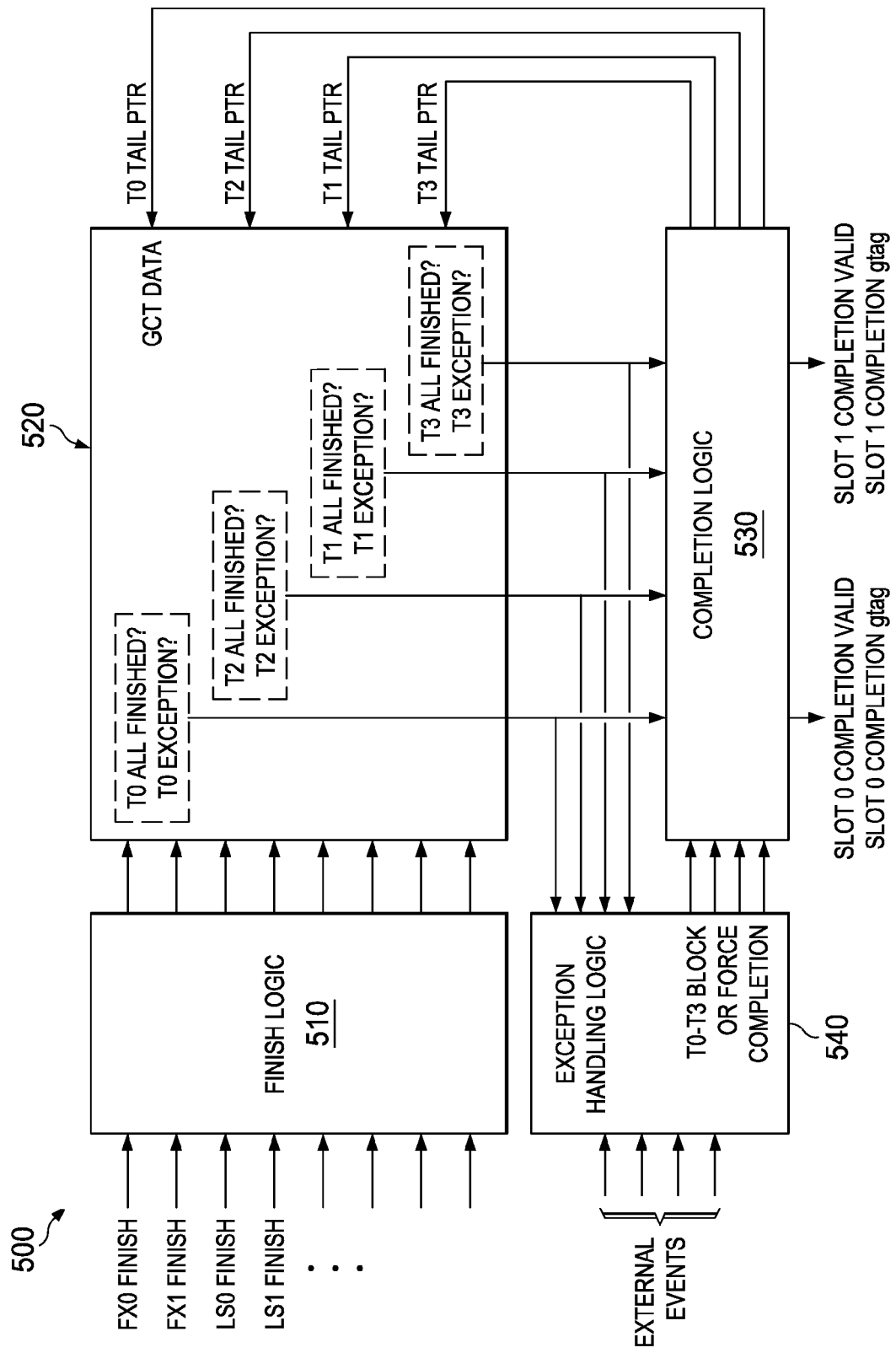
FIG. 5 is an example diagram illustrating a data flow between finish logic, GCT finish data, and completion logic in accordance with one illustrative embodiment.

FIG. 5 is an example diagram illustrating a data flow between finish logic, GCT finish data, and completion logic in accordance with one illustrative embodiment. As noted above, with one illustrative embodiment, completion of groups of instructions from the 4 simultaneously executing threads is limited to 2 groups of instructions at a time, 1 group from each of 2 threads. Thus, an arbitration mechanism is used between the more than 2 threads, e.g., 4 threads in the depicted example, which are simultaneously executing. This arbitration mechanism utilizes the slots, e.g., slot 0 and slot 1, and selection logic to select between groups of instructions completing on each of the SMT threads. The arbitration mechanism operates without biasing completion towards any particular thread, unless an exception condition occurs to some external event. The arbitration mechanism may be implemented, for example, as logic in the completion logic 530 of an SMT processor.

As shown in FIG. 5, the execution units 338 submit finish indications, e.g., FX0 Finish input, FX1 Finish input, LS0 Finish input, LS1 Finish input, and the like, to the finish logic 510 of the GCT 500. The finish logic 510, based on the finish indications from the execution units 338, processes the finish indications and sets appropriate finish bits in an appropriate entry of the GCT data 520. If an execution unit reports an exception during execution, the finish information reported to the finish logic 510 by the execution units also includes this exception information. The finish logic 510 processes this information and records appropriate exception information in appropriate entries of the GCT data 520. These entries correspond to finish bits 442 and exception status fields 444 shown previously as being part of GCT 410.

The each processor cycle, the completion logic 530 may provide the tail pointer (one for each thread) to the GCT data 520 to read a corresponding entry from the GCT data 520. If all of the finish bits in the corresponding entry have been set, indicating that all of the instructions for the group corresponding to the entry have finished execution by an execution unit, and there is no exception, then the group of instructions is read to complete. An indication that the group is ready to complete is sent to the completion logic 530 as the "Tx All Finished" output (where "Tx" is the particular thread identifier, e.g., T0, T1, T2, or T3). If the entry in the GCT indicates that an exception occurred in the group of instructions, such as by the setting of information in the exception information field 414 in FIG. 4, completion of the thread is blocked while the group is handed off to the exception handling logic 540 which will determine exactly if and why the group is allowed to complete. If the exception handling logic 540 determines that the group should be allowed to complete, the exception handling logic 540 sends a signal to the completion logic 530 to force completion of the particular thread. If the exception handling logic 540 determines that the group should not be allowed to complete, the exception handling logic 540 sends a signal to the completion logic 530 indicating that completion of the group of instructions is to be blocked. Such determinations may also be made based on external event signals. The determination of whether an instruction group should be allowed to complete or not based on external events is generally known in the art and thus, a detailed discussion is not presented herein.

Figure 6:
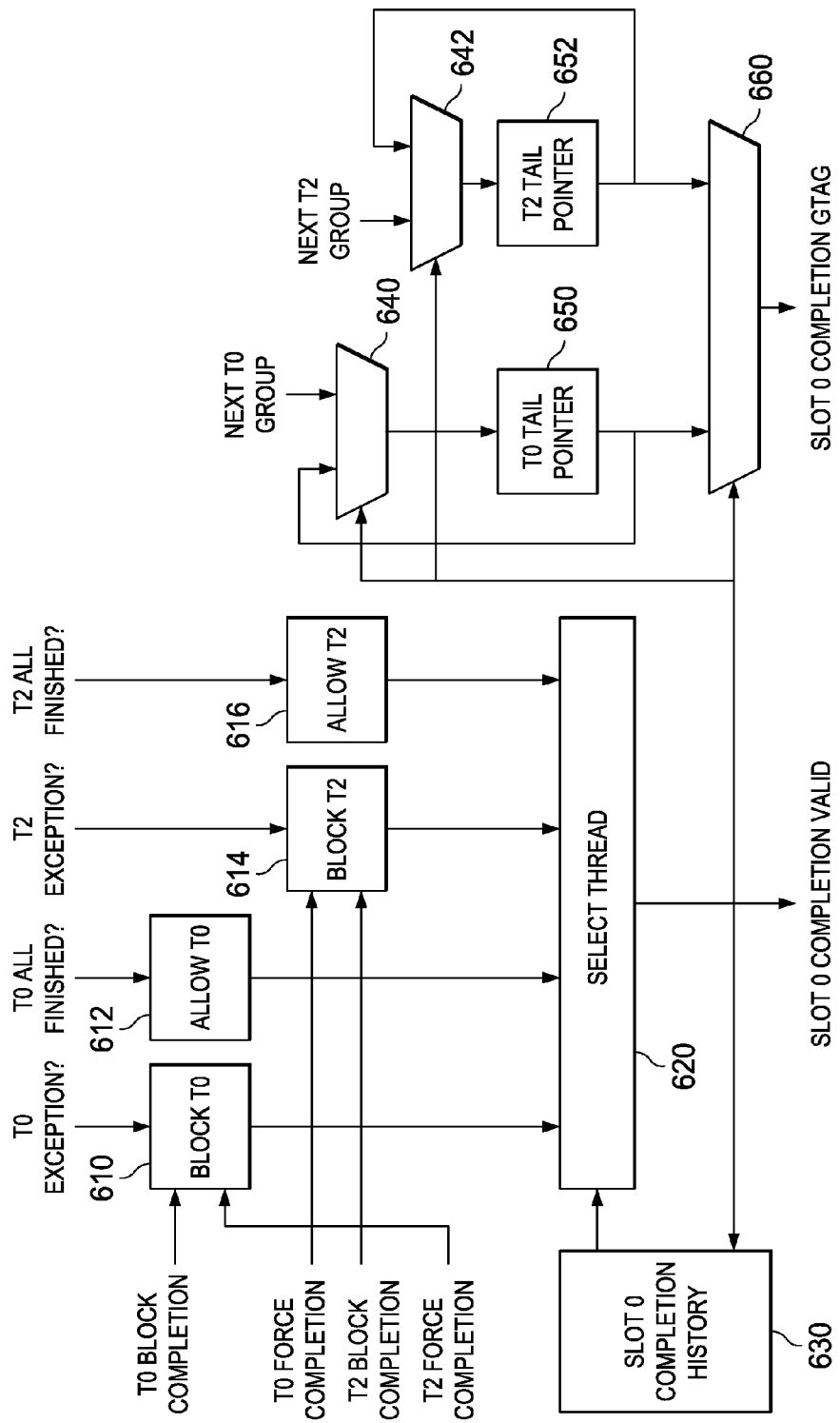
FIG. 6 is an example diagram of logic details for the completion logic 530 in FIG. 5 in accordance with one illustrative embodiment.

FIG. 6 is an example diagram of logic details for the completion logic 530 in FIG. 5 in accordance with one illustrative embodiment. The details shown in FIG. 6 are for one slot of the completion logic 530, i.e. slot 0. The logic shown in FIG. 6 may be replicated for additional slots, such as slot 1, in the completion logic so that greater numbers of simultaneous thread completions may be handled by the mechanisms of the illustrative embodiments.

In accordance with the mechanisms of the illustrative embodiments, threads T0, T1, T2, and T3 are grouped into thread pairs for each of the two completion slots S0 and S1 of the completion logic. In the depicted example in FIG. 6, threads T0 and T2 are paired for slot 0. Similarly, threads T1 and T3 may be paired for slot 1 (not shown). The threads are grouped into pairs because the depicted example supports 4 simultaneously executing threads (SMT4 mode of operation) but, in order to support resource limitations on other parts of the processor in which only 2 simultaneously completing threads are permitted, only one thread from each pair is permitted to complete. In other illustrative embodiments, in which even larger numbers of threads may be executing simultaneously, the grouping of threads may encompass more than two threads per slot or a larger number of slots than that shown in FIG. 6, depending on the implementation.

For example, each slot may be associated with three or more threads in some implementations with additional logic being provided to select from among the three or more threads, a particular thread to output for completion. As a further example, in other implementations, each slot may still be associated with pairs of threads, but the number of slots may be increased such that there may be three or more slots, and corresponding replications of the logic shown in FIG. 6, depending on the number of simultaneously executing threads supported by the architecture of the implementation.

Moreover, in the depicted example, the threads are associated with the slots in pairs to provide seamless switching between a SMT2 mode (in which only two threads are executed simultaneously as with the POWER5 architecture) and an SMT4 mode (in which four threads are executed simultaneously as with the improved architecture of the illustrative embodiments) in the architecture of the illustrative embodiments. Thus, the architecture of the illustrative embodiments may be set to either a SMT2 mode or an SMT4 mode, and such settings may be switched in a seamless manner. In both the SMT2 mode of operation and the SMT4 mode of operation, both slots 0 and 1 are utilized. However, in the SMT2 mode of operation, there is no competition necessary between threads on the same slot for completion since only one thread will be present on each of the slots. Hence the selection logic shown in FIG. 6, and described hereafter, may not be used in the SMT2 mode of operation.

In the depicted example, slot 0 is associated with even numbered threads while odd threads are associated with slot 1 (not shown). Whether a thread is even or odd may be determined based on its associated thread identifier (TID) which is a number allocated to the thread when the thread is spawned. When a group of instructions associated with a thread is ready to complete, as determined based on finish bits in an entry of the GCT data 520 in FIG. 5 identified by the tail pointer of the thread, a signal is received in the completion logic 530, from the GCT data 520 indicating that completion of that group of instructions is to be performed. For example, if the group of instructions corresponding to thread 0 is ready to complete, then the "T0 All Finished" signal may be received by the allow T0 logic 612 which essentially passes this information along to the select thread logic 620. Alternatively, if an exception occurred in the group of instructions, a signal is received in the completion logic 530, from the GCT data 520, indicating that an exception occurred. For example, if the group of instructions corresponding to thread 0 encountered an exception, then a "T0 Exception" signal may be received by the block T0 logic 610.

The block T0 logic 610 combines the exception signal from the GCT data 520 with T0 block signal from the exception handling logic 540 and T2 force completion signal from the exception handling logic 540 to determine whether the completion of the group of instructions from thread T0 should be blocked or not. Essentially, if an exception occurred and the exception handling logic 540 determines that either T0 should be blocked or T2 should be forced to complete, then the completion of the group of instructions for thread T0 is blocked. If an exception occurred, and the exception handling logic 540 determines that neither T0 should be blocked nor T2 should be forced to complete, then the group of instructions for the thread T0 is not blocked. Similarly, if no exception occurred, then completion of the group of instructions associated with thread T0 is not blocked. A similar operation is performed with regard to block T2 logic 614 using the T2 exception input signal, T0 force completion signal, and T2 block completion signal.

The select thread logic 620 performs an arbitration between threads 0 and 2 to determine which of the groups of instructions should be allowed to complete in the current processor cycle. The select thread logic 620 outputs a slot 0 completion valid signal along with a completed group id (gtag) to the group completion unit 342 in FIG. 3B indicating which thread's instruction group was selected for completion. This information is then used to de-allocate various resources associated with that group. The group completion unit 342 also provides the selected thread instruction group to store queue 344 for committing the results of the group of instructions to a storage device associated with the processor, e.g., a data cache, L2 cache, or the like.

The selection of which group of instructions to allow to complete during the current processor cycle is determined in a manner that does not bias completion to one thread or another under normal circumstances, i.e. unless there is an exception or forced completion. In one illustrative embodiment, unless either the block T0 logic 610 or the block T2 logic 614 indicates that completion of the group of instructions for the corresponding thread should be blocked, then the select thread logic 620 selects a thread based on the completion history information 630.

The completion history information 630 stores an identifier of the thread that last completed, i.e. the thread whose group of instructions was permitted to complete in the previous processor cycle. This information is used to select the other of the two threads for completion of its corresponding group of instructions. Thus, for example, if a group of instructions for thread 0 was allowed to complete last, i.e. in a previous processor cycle, as indicated by the slot 0 completion history information 630, then a group of instruction for thread 2 may be selected by the select thread logic 620 for the present processor cycle.

Hence, during normal operation, when there is a group of instructions ready to complete on more than one thread associated with a given slot, the thread that did not most recently complete is allowed to complete. The other thread's instruction group is essentially blocked at this point from completing, but will be able to complete in the following cycle since the completion history information 630 will have been updated.

The identity of the selected thread is output by the select thread logic 630 to the group completion unit 342 in FIG. 3B, the slot completion history 630, and is used as a selector input for multiplexers 640, 642, and 660. The multiplexers 640 and 642 select either the current thread instruction group or the next thread instruction group based on the status of the selector input from the select thread logic 620. For the thread that was selected, the corresponding multiplexer 640 or 642 will select the tail pointer for the next group of instructions for that thread. For the thread that was not selected, the multiplexer 640 or 642 will select the current tail pointer for the current group of instructions. The resulting tail pointers 650 and 652 are provided to multiplexer 660 which selects, based on the output from the select thread logic 620, one of these pointers to output as the slots completion global tag (gtag). The gtag is broadcast to other parts of the processor architecture to allow data to be committed and resources deallocated.

As described above, the selection of which thread's group of instructions to complete is based on the most recently completed thread identifier in the slot completion history unit 630. However, it should be appreciated that there may be instances where a thread may encounter exception conditions that may require it to either not complete while some other action is taken or that it must complete within a predetermined period of time, e.g., a predetermined number of processor cycles, and such normal operation may inhibit this from happening. Thus, this normal operation of the select thread logic 620 may be superseded by exception handling when a thread must complete at a certain time due to some external event, for example, or when an exception occurs requiring non-completion of the group of instructions. In non-normal operation, i.e. when an exception occurs or when external events require the forcing of completion of a group of instructions for a particular thread, the block T0 logic 610 and block T2 logic 614 may operate to override this normal behavior and force a particular thread's instruction group to complete. For example, with block T0 logic 610, if either the T0 block completion signal is asserted or the T2 force completion signal is asserted, then thread T0's instruction group is blocked from completing in the current processor cycle. That is, if the block signal from block T0 logic 610 is asserted, then the select thread logic 620 will automatically select the other thread's instruction group, i.e. thread T2's instruction group, for completion. Block T2 logic operates in a similar manner with regard to the T0 force completion and T2 block completion input signals.

Similar functionality is performed by similar select thread logic for the other slots of the completion logic, e.g., slot 1. Thus, in a SMT4 mode of operation, at most 2 threads of the 4 simultaneously executing threads are permitted to complete in a processor cycle. Therefore, with the control and arbitration mechanisms of the illustrative embodiments, a processor may execute groups of instructions from more than 2 threads simultaneously, i.e. execute more than 2 threads simultaneously, but only complete groups of instructions from a maximum of 2 threads simultaneously. This allows a SMT4 processing architecture, such as shown in FIGS. 3A-3B, to reuse or make use of the resources already developed for SMT2 processing architectures, such as the POWER5 processor architecture. Moreover, this allows a seamless switching between SMT2 and SMT4 modes of operation.

If the number of threads assigned to a given completion slot is increased, then the amount of completion history being tracked in the slot completion history unit 630 must also increase in order to make a fair selection of the threads that are ready to complete. For SMT4 only 1 stage of history is needed since there are only 2 threads assigned to a slot and the completion history of the other thread can be inferred from the single bit of history being tracked. If the design were expanded to SMT6, which would support six simultaneous threads, for instance, it would be necessary to know the order in which each of the last 2 threads completed since the $3^{rd}$ thread would have completed before any of the other two and would thus have the highest priority in completing. This can be expanded to any number of threads in a similar fashion as long the completion history is expanded accordingly.

Thus, the mechanisms of the illustrative embodiments permit the simultaneous processing of more than 2 threads while limiting completion of threads to a maximum of 2 threads per processor cycle. This provides the added processing power of being able to handle a large number of threads while permitting the mechanisms performing processing of the large number of threads to accommodate resource restrictions in other parts of the processor architecture in which at most 2 threads per processor cycle are permitted to complete. This minimizes the power and area consumption required to facilitate the simultaneous processing of more than 2 threads.

Figure 7:
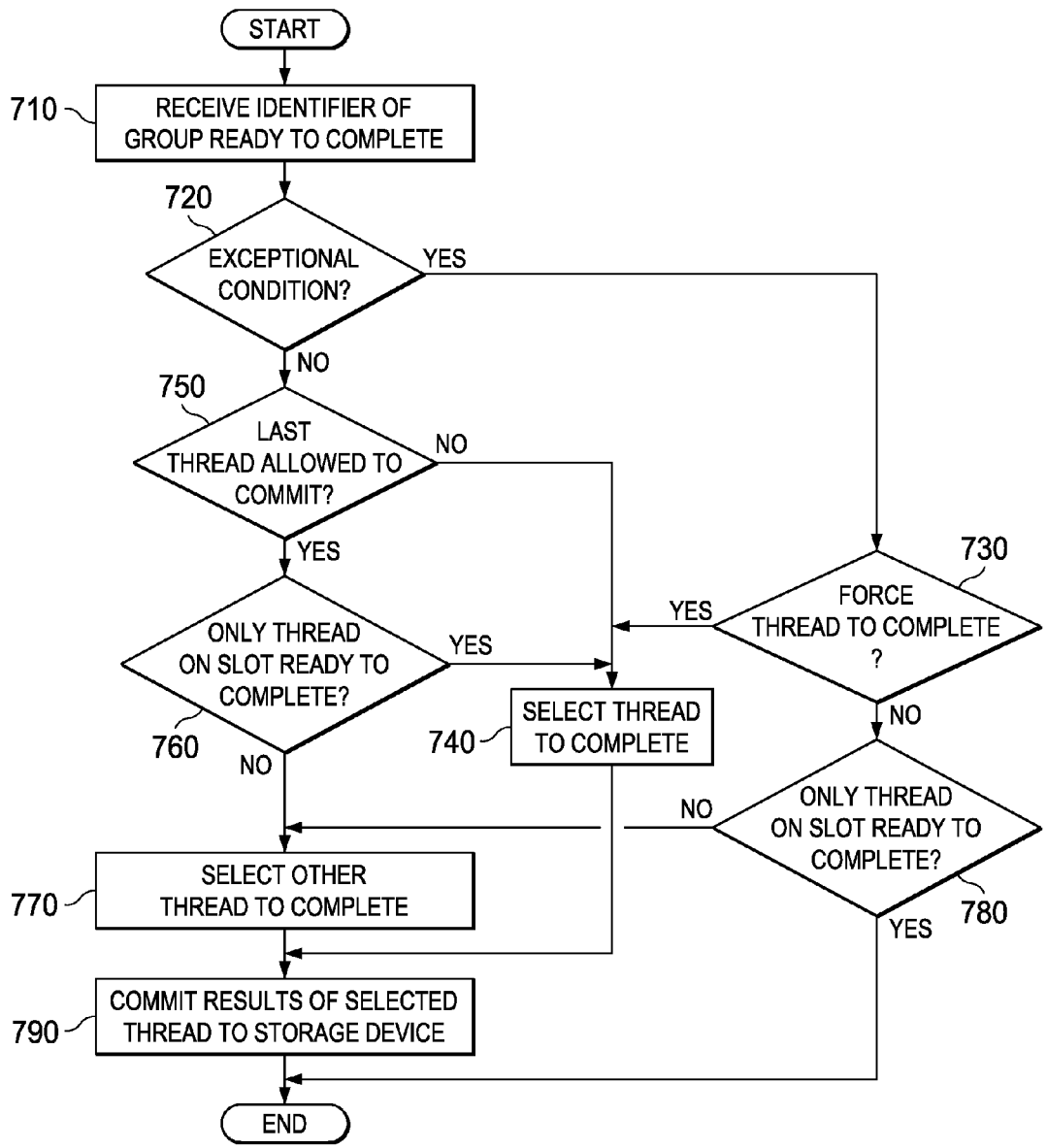
FIG. 7 is a flowchart outlining an example operation for completion of threads in accordance with one illustrative embodiment.

FIG. 7 is a flowchart outlining an example operation for completion of threads in accordance with one illustrative embodiment. The operation outlined in FIG. 7 may be performed for example, by arbitration logic in a processor, such as may be provided in a group completion portion of a processor pipeline, for example. The operation outlined in FIG. 7 is performed in association with a single slot of the arbitration logic in the processor. Thus, the operation outlined in FIG. 7 may be performed in parallel on multiple slots of the arbitration logic at substantially the same time, for example.

As shown in FIG. 7, the operation starts by receiving an identifier of a group of instructions associated with a thread, executing in a SMT processor, that are ready to complete, in a slot of the arbitration logic (step 710). A determination is first made as to whether an exceptional condition is present, e.g., an input indicating a thread to select is received (step 720). If so, then the determination is made as to whether the exception condition requires the thread to complete, i.e. the thread is forced to complete, or if the thread is to be blocked from completing (step 730). If the thread is being forced to complete, the thread is selected as the thread to complete (step 740) and operation continues to step 780 where results are committed to architected state.

Otherwise, if the thread indicated by the exceptional condition is not being forced to complete, i.e. the thread is blocked (step 730), processing continues at step 780 where a determination is made as to whether this thread is the only thread, associated with the slot, that has a group of instructions ready for completion. If the thread is not the only thread on the slot read for completion, then another thread is selected for completion (step 770). If this thread is the only thread associated with the slot that has a group of instructions ready to complete, then processing ends because the thread was blocked from completing due to an exception, but no other threads were ready to complete.

If no exceptional condition is present, then it is determined whether the thread was the last thread allowed to complete (step 750). If the determination is made that the thread was the last to complete, the operation continues to step 760 where a determination is made as to whether this thread is the only thread, associated with the slot, that has a group of instructions ready for completion. If the thread is not the only thread on the slot read for completion, then another thread is selected for completion (step 770). If this thread is the only thread associated with the slot that has a group of instructions ready to complete, then this thread is selected for completion (step 740).

Thus, step 770 is reached if the exceptional condition indicates that the thread is to be blocked (step 730) and it is not the only thread ready for completion on the slot (step 780), or if the thread was the last one allowed to complete (step 750) and it is not the only thread ready for completion on the slot (step 760). As an example, referring again to FIG. 6, if only one of the T0 All Finished and T2 All Finished inputs is asserted, for example, then only one of the threads, i.e. the corresponding thread T0 or thread T2, has a group of instructions ready to complete. In such a case, the slot completion history information 630 is not utilized and instead, the only thread that has a group of instruction ready for completion is selected. The results of the execution of the group of instructions associated with the selected thread are then output for commitment to a storage device associated with the processor and the operation terminates.

If the thread was not the last thread to complete, then the thread is selected for completion (step 740). The operation continues to step 790 where results are committed to architected state. The operation then terminates.

Thus, the mechanisms of the illustrative embodiments provide arbitration logic for arbitrating between multiple threads with regard to completion of groups of instructions executed in association with these threads. In particular, the illustrative embodiments provide an arbitration mechanism for permitting at most 2 groups of instructions from 2 threads to complete in a processor cycle while allowing more than two threads to be executed simultaneously by the processor. As a result, the complexity of processor resources is minimized while increasing the performance of the processor with regard to the number of threads that may be simultaneously executed.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a processor, for thread completion arbitration, comprising:
executing, by the processor, more than two threads of instructions simultaneously in the processor;
selecting, by selection logic of the processor, a first thread from a first subset of threads, in the more than two threads, for completion of execution within the processor;
selecting, by the selection logic, a second thread from a second subset of threads, in the more than two threads, for completion of execution within the processor;
identifying, in the first thread and the second thread, instructions ready for completion; and
completing, by completion logic of the processor, execution of the identified instructions in the first and second threads by committing results of the execution of the identified instructions of the first and second threads to a storage device associated with the processor, wherein:
at least one of the first subset of threads or the second subset of threads comprise two or more threads from the more than two threads,
the first subset of threads and second subset of threads have different threads from one another, and
all of the more than two threads of instructions are processed through a same instruction pipeline of the processor.

2. The method of claim 1, wherein both the first thread and the second thread are completed in a same single processor cycle.

3. The method of claim 1, wherein the first subset of threads comprises odd numbered threads and the second subset of threads comprises even numbered threads in the more than two threads.

4. The method of claim 1, wherein selecting the first thread from the first subset of threads comprises:
determining which thread in the first subset of threads was not last completed in a previous processor cycle; and
selecting a thread that was not last completed in a previous processor cycle as the first thread for completion of execution within the processor.

5. The method of claim 1, wherein selecting the first thread from the first subset of threads comprises:
- determining if a thread in the first subset of threads is indicated as a thread whose completion is to be forced due to one or more other threads in the first subset of threads having an associated exception condition generated by execution of an instruction in the one or more other threads; and
- selecting the thread whose completion is to be forced as the first thread for completion of execution within the processor.

6. The method of claim 1, wherein selecting the first thread from the first subset of threads comprises:
- determining if a thread in the first subset of threads is indicated as a thread whose completion is to be blocked due to the thread having an associated exception condition generated by execution of an instruction in the thread; and
- selecting another thread in the first subset of threads, different from the thread whose completion is to be blocked, as the first thread for completion of execution within the processor.

7. The method of claim 6, wherein selecting the first thread from the first subset of threads further comprises:
- determining if there is only one thread, in the first subset of threads, having an instruction group that is ready for completion by the processor, wherein the selection of another thread in the first subset of threads is performed only if there is at least one other thread in the first subset of threads that has an instruction group that is ready for completion by the processor.

8. A computer program product comprising a non-transitory computer recordable medium having a computer readable program recorded thereon, wherein the computer readable program, when executed on a computing device, causes the computing device to:
- execute more than two threads of instructions simultaneously in a processor of the computing device;
- select a first thread from a first subset of threads, in the more than two threads, for completion of execution within the processor;
- select a second thread from a second subset of threads, in the more than two threads, for completion of execution within the processor;
- identify, in the first thread and the second thread, instructions ready for completion; and
- complete execution of the identified instructions in the first and second threads by committing results of the execution of the identified instructions of the first and second threads to a storage device associated with the processor, wherein:
- at least one of the first subset of threads or the second subset of threads comprise two or more threads from the more than two threads,
- the first subset of threads and second subset of threads have different threads from one another, and
- all of the more than two threads of instructions are processed through a same instruction pipeline of the processor.

9. The computer program product of claim 8, wherein both the first thread and the second thread are completed in a same single processor cycle.

10. The computer program product of claim 8, wherein the first subset of threads comprises odd numbered threads and the second subset of threads comprises even numbered threads in the more than two threads.

11. The computer program product of claim 8, wherein the computer readable program causes the computing device to select the first thread from the first subset of threads by:
- determining which thread in the first subset of threads was not last completed in a previous processor cycle; and
- selecting a thread that was not last completed in a previous processor cycle as the first thread for completion of execution within the processor.

12. The computer program product of claim 8, wherein the computer readable program causes the computing device to select the first thread from the first subset of threads by:
- determining if a thread in the first subset of threads is indicated as a thread whose completion is to be forced due to one or more other threads in the first subset of threads having an associated exception condition generated by execution of an instruction in the one or more other threads; and
- selecting the thread whose completion is to be forced as the first thread for completion of execution within the processor.

13. The computer program product of claim 8, wherein the computer readable program causes the computing device to select the first thread from the first subset of threads by:
- determining if a thread in the first subset of threads is indicated as a thread whose completion is to be blocked due to the thread having an associated exception condition generated by execution of an instruction in the thread; and
- selecting another thread in the first subset of threads, different from the thread whose completion is to be blocked, as the first thread for completion of execution within the processor.

14. An apparatus, comprising:
- a processor; and
- a storage device coupled to the processor, wherein the processor comprises logic that causes the processor to:
- execute more than two threads of instructions simultaneously;
- select a first thread from a first subset of threads, in the more than two threads, for completion of execution;
- select a second thread from a second subset of threads, in the more than two threads, for completion of execution;
- identify, in the first thread and the second thread, instructions ready for completion; and
- complete execution of the identified instructions in the first and second threads by committing results of the execution of the identified instructions of the first and second threads to the storage device, wherein:
- at least one of the first subset of threads or the second subset of threads comprise two or more threads from the more than two threads,
- the first subset of threads and second subset of threads have different threads from one another, and
- all of the more than two threads of instructions are processed through a same instruction pipeline of the processor.

15. The apparatus of claim 14, wherein both the first thread and the second thread are completed in a same single processor cycle.

16. The apparatus of claim 14, wherein the first subset of threads comprises odd numbered threads and the second subset of threads comprises even numbered threads in the more than two threads.

17. The apparatus of claim 14, wherein the processor selects the first thread from the first subset of threads by:
- determining which thread in the first subset of threads was not last completed in a previous processor cycle; and selecting a thread that was not last completed in a previous processor cycle as the first thread for completion of execution.

18. The apparatus of claim 14, wherein the processor selects the first thread from the first subset of threads by:
   determining if a thread in the first subset of threads is indicated as a thread whose completion is to be forced due to one or more other threads in the first subset of threads having an associated exception condition generated by execution of an instruction in the one or more other threads; and
   selecting the thread whose completion is to be forced as the first thread for completion of execution.

19. The apparatus of claim 14, wherein the processor selects the first thread from the first subset of threads by:
   determining if a thread in the first subset of threads is indicated as a thread whose completion is to be blocked due to the thread having an associated exception condition generated by execution of an instruction in the thread; and
   selecting another thread in the first subset of threads, different from the thread whose completion is to be blocked, as the first thread for completion of execution.

20. The apparatus of claim 19, wherein the processor selects the first thread from the first subset of threads further by:
   determining if there is only one thread, in the first subset of threads, having an instruction group that is ready for completion by the processor, wherein the selection of another thread in the first subset of threads is performed only if there is at least one other thread in the first subset of threads that has an instruction group that is ready for completion by the processor.

* * * * *